(12) United States Patent
Norquist et al.

(10) Patent No.: US 11,878,402 B2
(45) Date of Patent: Jan. 23, 2024

(54) HYDRAULIC POWER TOOL

(71) Applicant: Milwaukee Electric Tool Corporation, Brookfield, WI (US)

(72) Inventors: Eric D. Norquist, Brookfield, WI (US); James G. Ballard, Brookfield, WI (US); Kris J. Kanack, Brookfield, WI (US); Luke J. Skinner, Brookfield, WI (US); Robert Jensen, Brookfield, WI (US); Marc S. D'Antuono, Brookfield, WI (US); Peter Davies, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 209 days.

(21) Appl. No.: 16/745,688

(22) Filed: Jan. 17, 2020

(65) Prior Publication Data

US 2020/0298388 A1 Sep. 24, 2020

Related U.S. Application Data

(60) Provisional application No. 62/819,790, filed on Mar. 18, 2019.

(51) Int. Cl.
   *B25F 5/00* (2006.01)
   *B25F 5/02* (2006.01)
   *B21D 39/04* (2006.01)

(52) U.S. Cl.
   CPC ............ *B25F 5/005* (2013.01); *B21D 39/048* (2013.01); *B25F 5/02* (2013.01)

(58) Field of Classification Search
   CPC ... B25F 5/005; B25F 5/02; B25F 5/00; B21D 39/048; B23P 11/005; B23P 19/027
   See application file for complete search history.

(56) References Cited

U.S. PATENT DOCUMENTS 3,071,926 A * 1/1963 Olson ...................... B66F 9/22
                                                        91/420
4,034,592 A * 7/1977 Chen .................... B21D 39/046
                                                        72/402

(Continued)

FOREIGN PATENT DOCUMENTS

| DE | 9109468 U1 | 1/1992 |
| WO | 2014/015689 A1 | 1/2014 |
| WO | 2016/112153 A2 | 7/2016 |

*Primary Examiner* — Thomas M Wittenschlaeger
*Assistant Examiner* — Katie L Gerth
(74) *Attorney, Agent, or Firm* — Quarles & Brady LLP

(57) ABSTRACT

An example hydraulic tool includes: a fluid reservoir; a pump; an electric motor; a cylinder; a piston; a first trigger button; a second trigger button; and a controller configured to perform operations comprising: receiving a first signal when the first trigger button is triggered, responsively, causing the electric motor to rotate in a first rotational direction, thereby: (i) causing the pump to provide fluid to the cylinder, and (ii) causing the piston to move in a first linear direction, thereafter, receiving a second signal when the second trigger button is triggered, and responsively to the second signal, causing the electric motor to rotate in a second rotational direction opposite the first rotational direction, thereby: (i) opening a fluid path from the cylinder to the fluid reservoir, and (ii) causing the piston to move in a second linear direction opposite the first linear direction.

16 Claims, 13 Drawing Sheets

(56) References Cited

U.S. PATENT DOCUMENTS

| | | |
|---|---|---|
| 4,136,549 A | 1/1979 | Ytle et al. |
| 5,778,755 A * | 7/1998 | Boese .................. B25F 5/005 91/401 |
| 6,324,884 B1 | 12/2001 | Barjesteh et al. |
| 6,457,338 B1 * | 10/2002 | Frenken ............... B21D 39/04 29/708 |
| 6,490,962 B1 * | 12/2002 | Schultz ................ F15B 11/024 91/428 |
| 6,679,340 B1 * | 1/2004 | Tatai ................... F15B 15/149 91/428 |
| 6,990,888 B2 * | 1/2006 | Harwath ............... B25B 27/10 91/428 |
| 7,421,877 B2 | 9/2008 | Frenken |
| 7,788,962 B2 | 9/2010 | Chiasson et al. |
| 7,814,827 B2 | 10/2010 | Frenken et al. |
| D690,177 S | 9/2013 | Frenken |
| D700,032 S | 2/2014 | Frenken |
| D709,748 S | 7/2014 | Frenken |
| D710,173 S | 8/2014 | Frenken |
| 9,272,477 B2 | 3/2016 | Kasai |
| 9,744,628 B1 * | 8/2017 | Kuo ........................ C21D 7/02 |
| 2002/0096342 A1 * | 7/2002 | Milbourne ............. B25B 21/00 173/178 |
| 2010/0275672 A1 * | 11/2010 | Frenken ................ B25B 27/10 72/453.01 |
| 2012/0241049 A1 | 9/2012 | Kato et al. |
| 2016/0167186 A1 * | 6/2016 | Chan ...................... B25F 5/00 173/2 |
| 2017/0356472 A1 * | 12/2017 | Ballard ................ H01R 43/048 |
| 2017/0358909 A1 | 12/2017 | Ballard |
| 2018/0093317 A1 | 4/2018 | Skinner |
| 2018/0093319 A1 * | 4/2018 | Skinner ................. B26B 27/00 |
| 2018/0326600 A1 * | 11/2018 | Wason .................. B25F 5/005 |
| 2023/0191581 A1 * | 6/2023 | Ballard ................. B25F 5/005 173/1 |

* cited by examiner

HYDRAULIC POWER TOOL

CROSS REFERENCE TO RELATED APPLICATION

The present application claims priority to U.S. provisional application No. 62/819,790, filed on Mar. 18, 2019, and entitled "Hydraulic Power Tool," the entire contents of which is herein incorporated by reference as if fully set forth in this description.

FIELD

The present disclosure relates generally to hydraulic power tools.

BACKGROUND

A powered tool may include a movable ram that is actuatable by a hydraulic or electromechanical actuation system. By providing power to the actuation system, the ram moves to perform an operation such as cutting, crimping, separation, blanking, etc. of an object.

SUMMARY

The present disclosure describes embodiments that relate to systems, apparatuses, tools, and methods associated with a hydraulic power tool.

In an example implementation, the present disclosure describes a hydraulic tool. The hydraulic tool includes: (i) a fluid reservoir; (ii) a pump fluidly coupled to the fluid reservoir; (iii) an electric motor mechanically coupled to the pump; (iv) a cylinder; (v) a piston slidably accommodated within the cylinder; (vi) a first trigger button; (vii) a second trigger button; and (viii) a controller configured to perform operations comprising: receiving a first signal when the first trigger button is triggered, in response to the first signal, causing the electric motor to rotate in a first rotational direction, thereby: (a) causing the pump to provide fluid to the cylinder, and (b) causing the piston to move in a first linear direction, thereafter, receiving a second signal when the second trigger button is triggered, and in response to the second signal, causing the electric motor to rotate in a second rotational direction opposite the first rotational direction, thereby: (i) opening a fluid path from the cylinder to the fluid reservoir, and (ii) causing the piston to move in a second linear direction opposite the first linear direction.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of one or more illustrative embodiments of the present disclosure when read in conjunction with the accompanying drawings, wherein:

DETAILED DESCRIPTION

Figure 1:
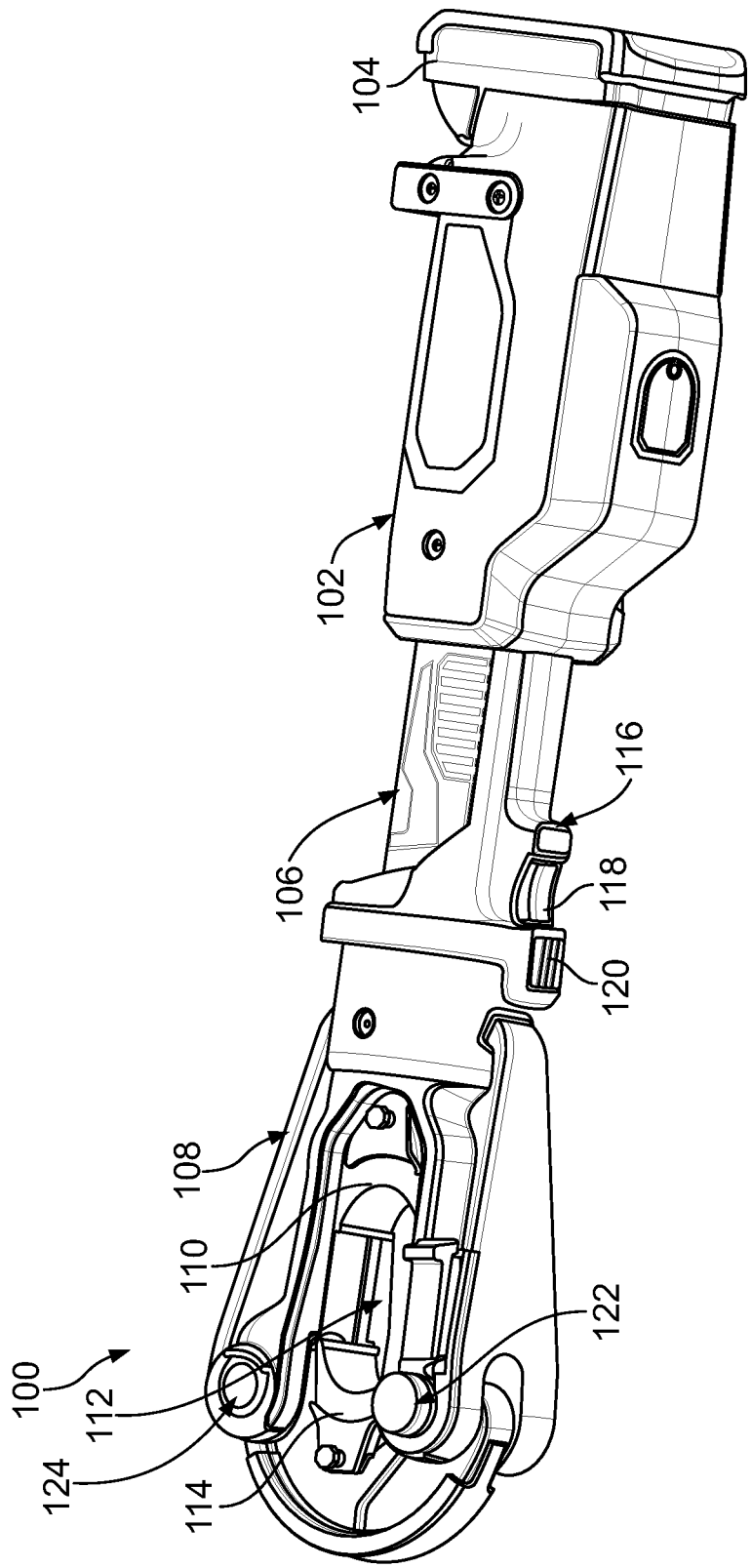
FIG. 1 illustrates a hydraulic tool, in accordance with an example implementation.

FIG. 1 illustrates a hydraulic tool 100, in accordance with an example implementation. Although the example implementation described herein references an example crimping tool, it should be understood that the features of this disclosure can be implemented in any other tool (cutting, separation, blanking, etc.). In addition, any suitable size, shape or type of elements or materials could be used.

The hydraulic tool 100 includes a housing 102. As described below, the housing 102 can contain an electric motor (e.g., brushless direct current motor), a gear reducer coupled to the electric motor, and a pump. The hydraulic tool 100 also includes a battery 104 coupled to the housing 102 and configured to provide electric power to operate the electric motor.

The hydraulic tool 100 further includes a cylinder 106 coupled to the housing 102. The cylinder 106 is configured as a hydraulic actuator cylinder and the hydraulic tool 100 includes a piston that is slidably accommodated within the cylinder 106 as described below. The piston can move in a first linear direction, e.g., extend, or move in a second linear opposite the first linear direction, e.g., retract within the cylinder 106.

The hydraulic tool 100 includes a crimper frame 108 coupled to the cylinder 106 and/or the housing 102. Further, the piston disposed within the cylinder 106 is coupled to a ram 110 (e.g., a moveable crimping head). As the piston extends (moves in the first linear direction), the ram 110 can move within work area 112 toward a crimping anvil 114 disposed opposite the ram 110. An object or a cable can be disposed in the work area 112, and the ram 110 can apply a force on the cable to crimp it as the ram 110 extends.

The hydraulic tool 100 can further include a handle 116 that can be coupled to the housing 102 and the crimper frame 108. An exterior profile of the handle 116 can have at least two depressions that are spatially arranged in series along the portion of the exterior profile of the handle 116. The depressions are configured to receive or house an extension trigger button 118 and a retraction trigger button 120. The extension trigger button 118 can also be referred to as the forward trigger, whereas the retraction trigger button 120 can be referred to as a reverse trigger. Further, the handle 116 can be referred to as a trigger collar.

An operator can grip around the cylinder 106 such that the operator's fingers can reach the trigger buttons 118, 120. As described in detail below, pressing the extension trigger button 118 generates an electric signal that causes the piston and the ram 110 coupled thereto to extend to perform a crimping operation. On the other hand, pressing the retraction trigger button 120 generates an electric signal that causes the piston and the ram 110 coupled thereto to retract (i.e., move in the second linear direction) and release a crimped cable.

Figure 2:
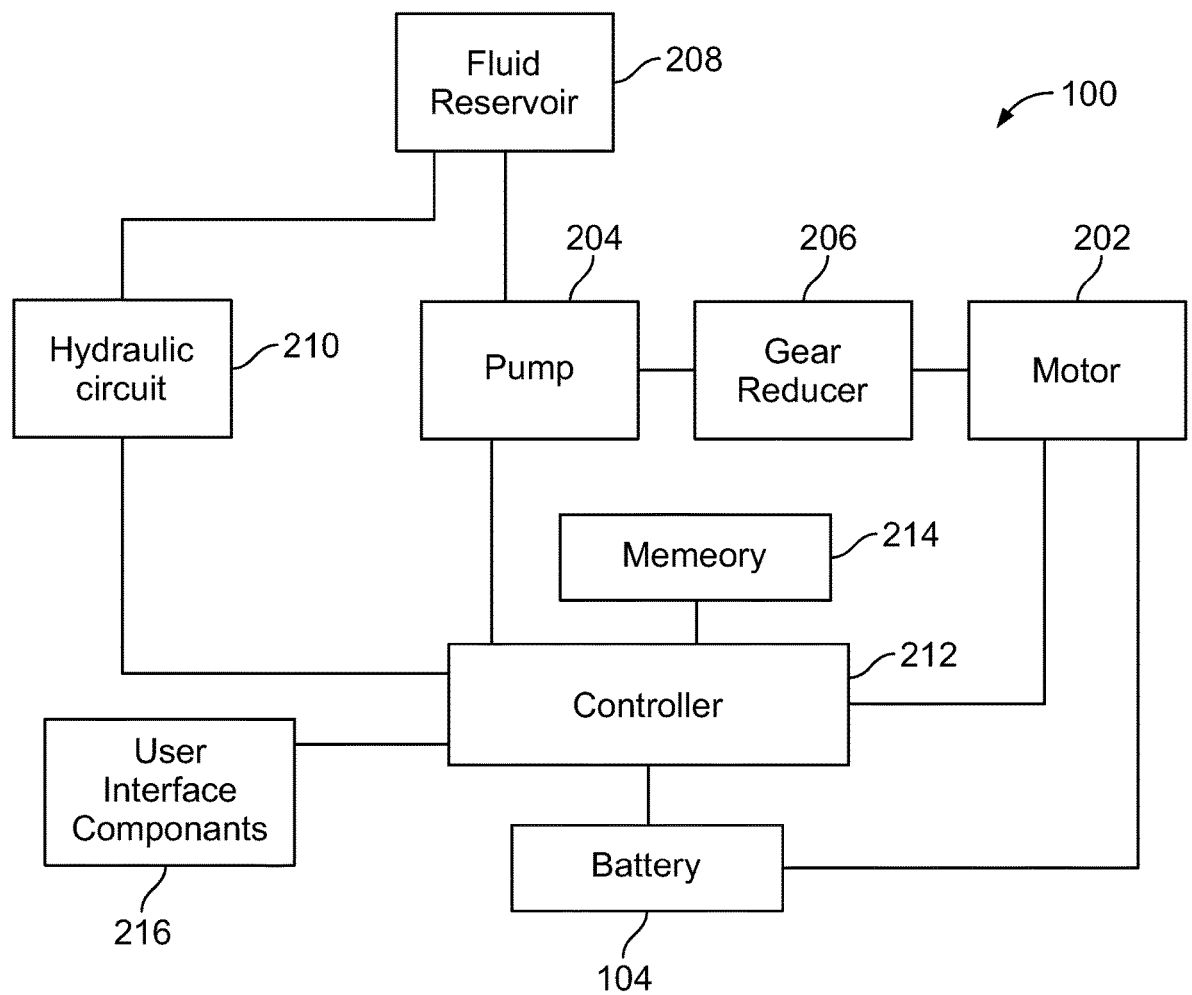
FIG. 2 illustrates a block diagram representing components of the hydraulic tool illustrated in FIG. 1, in accordance with an example implementation.

FIG. 2 illustrates a block diagram representing components of the hydraulic tool 100, in accordance with an example implementation. As illustrated in FIG. 2, the hydraulic tool 100 includes the battery 104 configured to provide electric power to an electric motor 202. The electric motor 202 can be mechanically coupled to a pump 204 via a gear reducer 206 configured to reduce a rotational speed of an output shaft of the electric motor 202 that rotates when the electric motor 202 is actuated.

As the electric motor 202 is actuated, the pump 204 draws fluid from a fluid reservoir 208 and then provides fluid via a hydraulic circuit 210 to the cylinder 106 of the hydraulic tool 100 to drive (e.g., extend) the piston disposed therein and move the ram 110. The electric motor 202 is actuated via command signals provided by a controller 212 of the hydraulic tool 100.

The controller 212 can include one or more processors or microprocessors and may include data storage (e.g., memory, transitory computer-readable medium, non-transitory computer-readable medium, etc.), such as memory 214. The memory 214 can have stored thereon instructions that, when executed by the one or more processors of the controller 212, cause the controller 212 to perform the operations described herein. In examples, the memory 214 may include a plurality of look-up tables. For example, at least one stored look-up table can include work piece information or data, such as connector data. Such connector data can include, as just one example, connector type (e.g., Aluminum or Copper connectors) and can also include a preferred crimp distance for certain types of connectors and certain sizes of connectors. Such a preferred crimp distance can include a distance that the piston disposed within the cylinder 106 (and thus the ram 110) moves within the work area 112 toward the crimping anvil 114 in order to achieve a desired crimp for a particular connector type having a specific size.

In examples, the hydraulic tool 100 can include a communication interface that enables the controller 212 to communicate with various components of the hydraulic tool 100 such as user interface components 216, the electric motor 202, the memory 214, the battery 104, and various components of the hydraulic circuit 210.

The user interface components 216 include the extension trigger button 118 and the retraction trigger button 120, among other components such as a display, light emitting diodes, indicative lights, switches, touch screens, etc. The controller 212 can receive input or input information from various input devices of the user interface components 216, and in response provide electrical signals to other components of the hydraulic tool 100.

Figure 3:
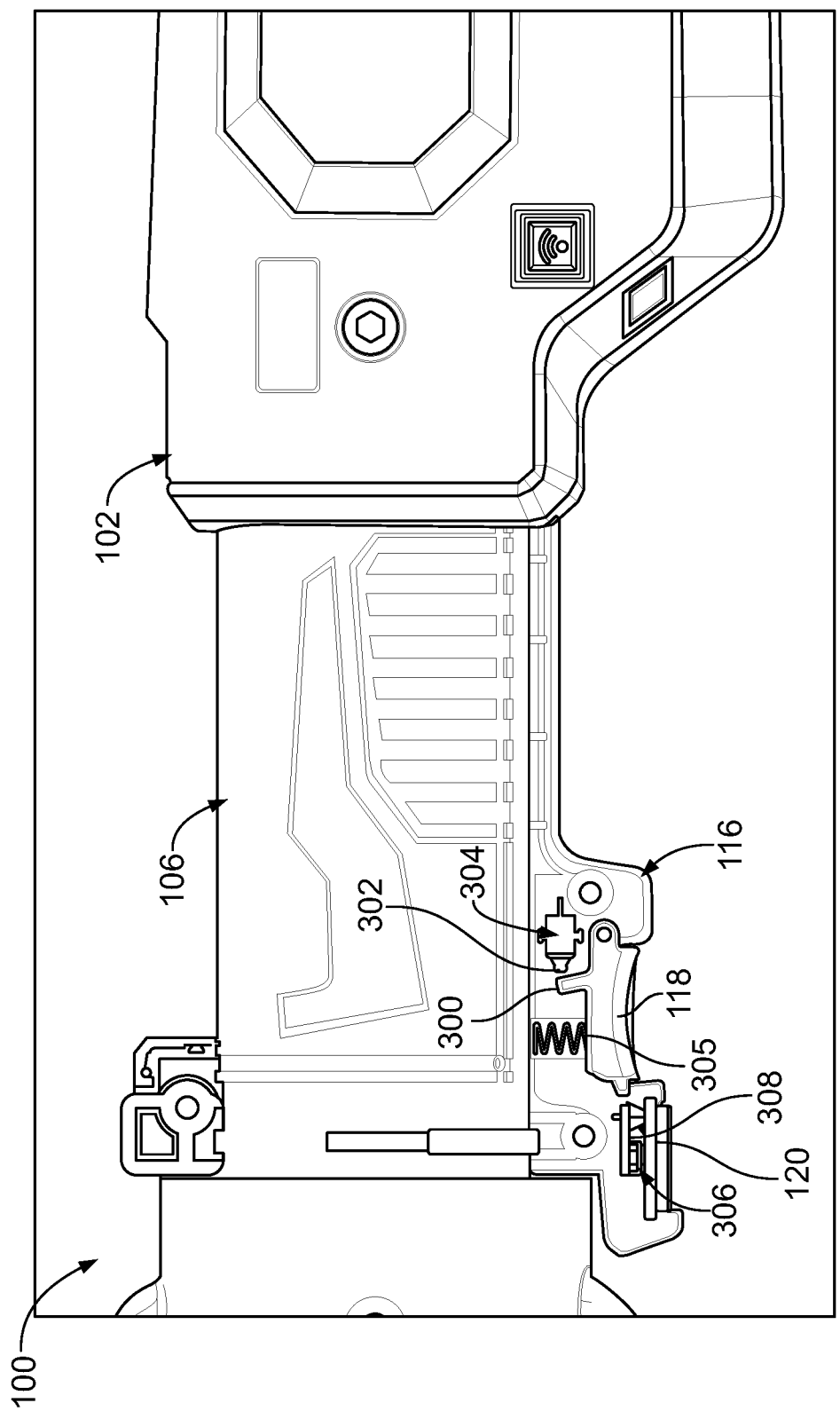
FIG. 3 illustrates is a partial view of the hydraulic tool shown in FIG. 1 illustrating internal components of trigger buttons, in accordance with an example implementation.

FIG. 3 is a partial view of the hydraulic tool 100 illustrating internal components of the trigger buttons 118, 120, in accordance with example implementation. As shown, the extension trigger button 118 has a protruding member 300. When the extension trigger button 118 is pressed or pulled, the protruding member 300 touches a contact 302 of a switch 304, thus closing an electric circuit. Closing this electric circuit provides an electric signal via wires to the controller 212 as described below with respect to FIG. 4. The electric signal indicates to the controller 212 that the extension trigger button 118 has been triggered or activated. In response, the controller 212 sends a command signal causing the electric motor 202 to rotate in a first rotational direction, thereby causing the piston inside the cylinder 106 to extend. If the extension trigger button 118 is released by the operator, a spring 305 pushes the extension trigger button 118 back to its unactuated position, rendering the electric circuit open and stopping the electric signal to the controller 212, which in turn can stop the electric motor 202 from rotating.

Similarly, when the retraction trigger button 120 is pulled or pressed, it causes a contact 306 to close an electric circuit of a printed circuit board 308. An electric signal is then provided via wires to the controller 212, indicating to the controller 212 that the retraction trigger button 120 has been triggered or activated. In response, the controller 212 sends a command signal causing the electric motor 202 to rotate in a second rotational direction opposite the first rotational direction, thereby causing the piston inside the cylinder 106 to retract. If the retraction trigger button 120 is released by the operator, it returns to its unactuated position, stopping the electric signal to the controller 212, which in turn can stop the electric motor 202 from rotating.

Figure 4:
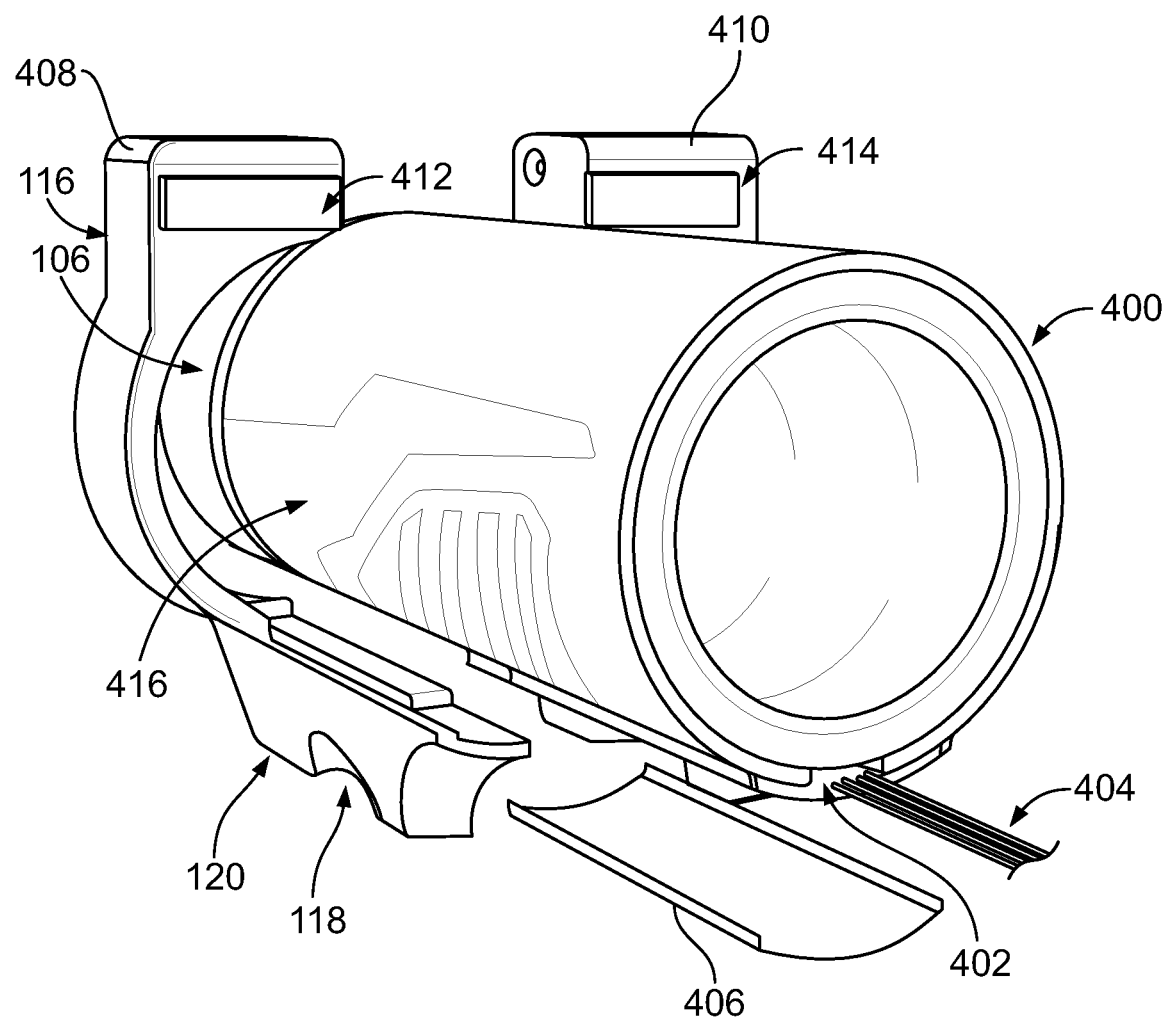
FIG. 4 illustrates a partial exploded view of the hydraulic tool of FIG. 1, in accordance with an example implementation.

FIG. 4 illustrates a partial exploded view of the hydraulic tool 100, in accordance with an example implementation. As shown in FIG. 4, the hydraulic tool 100 can include an elastomeric wrap 400 (e.g., rubber wrap) that is disposed about an exterior peripheral surface of the cylinder 106. In an example, the elastomeric wrap 400 can be made as a flat-molded part that is then assembled to, wrapped around, or molded over the cylinder 106. As an example for illustration, the elastomeric wrap 400 can be about 1.5 millimeter thick. The elastomeric wrap 400 can be configured as a C-shaped wrap such that it has a partial circular cross section and forms a gap 402 as shown.

The hydraulic tool 100 further includes wires 404 that are disposed through the gap 402 of the elastomeric wrap 400. The wires 404 electrically couple the trigger buttons 118, 120 to the controller 212 of the hydraulic tool 100.

The hydraulic tool 100 further includes a wire cover 406 having a curved profile that matches curvature of the cylinder 106 and is configured to cover the wires 404 disposed through the gap 402 to protect the wires 404. In an example, the wire cover 406 can be made of an extruded stamped metal material. In other examples, the wire cover 406 can be made of a plastic material. The wire cover 406 can be retained or secured to the elastomeric wrap 400 and the cylinder 106 via the handle 116 (the trigger collar).

As depicted in FIG. 4, as an example, the handle 116 can be configured as a two-piece collar having a first collar piece 408 and a second collar piece 410. Each of the collar pieces 408, 410 has a curved, concave interior peripheral surface that matches curvature of the cylinder 106. With this configuration, the collar pieces 408, 410 can be assembled to each other around the exterior peripheral surface of the cylinder 106. Bolts, screws, or other fastening methods can be used to couple the two collar pieces 408, 410 to each other.

In an example, the handle 116 can include hand rest portions 412, 414 formed or over-molded thereon. The hand rest portions 412, 414 can provide a comfortable hand rest to the operator gripping the hydraulic tool 100 to prevent the hands of the operator from rubbing against metallic parts or otherwise uncomfortable materials. Further, the elastomeric wrap 400 can include grip features 416 over-molded thereon to facilitate gripping the hydraulic tool 100 (e.g., provide friction to hands of the operator to preclude slippage of the hydraulic tool 100 from the operator).

Figure 5A:
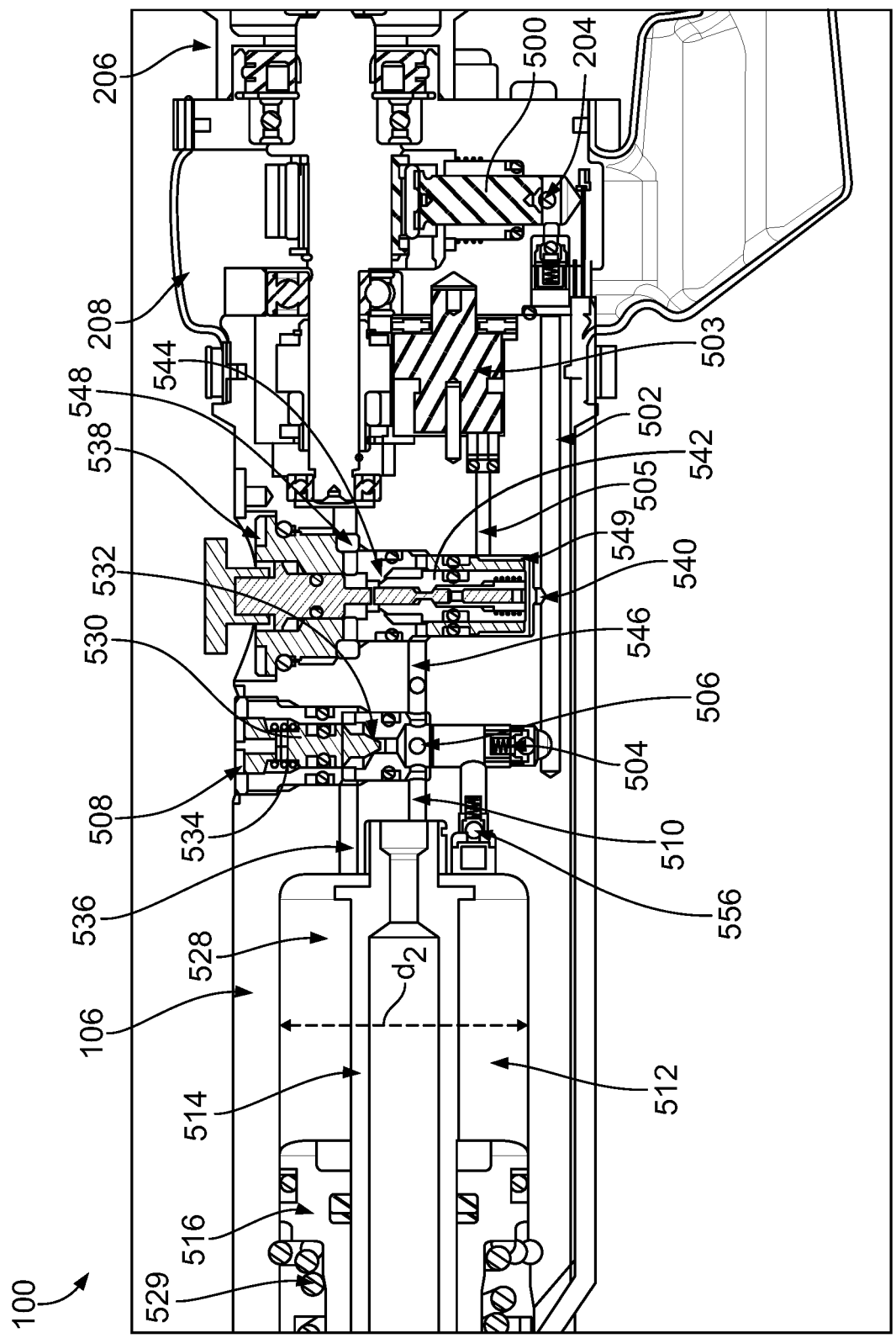
FIG. 5A illustrates an internal, partial cross-sectional side view of the hydraulic tool of FIG. 1, in accordance with an example implementation.
Figure 5B:
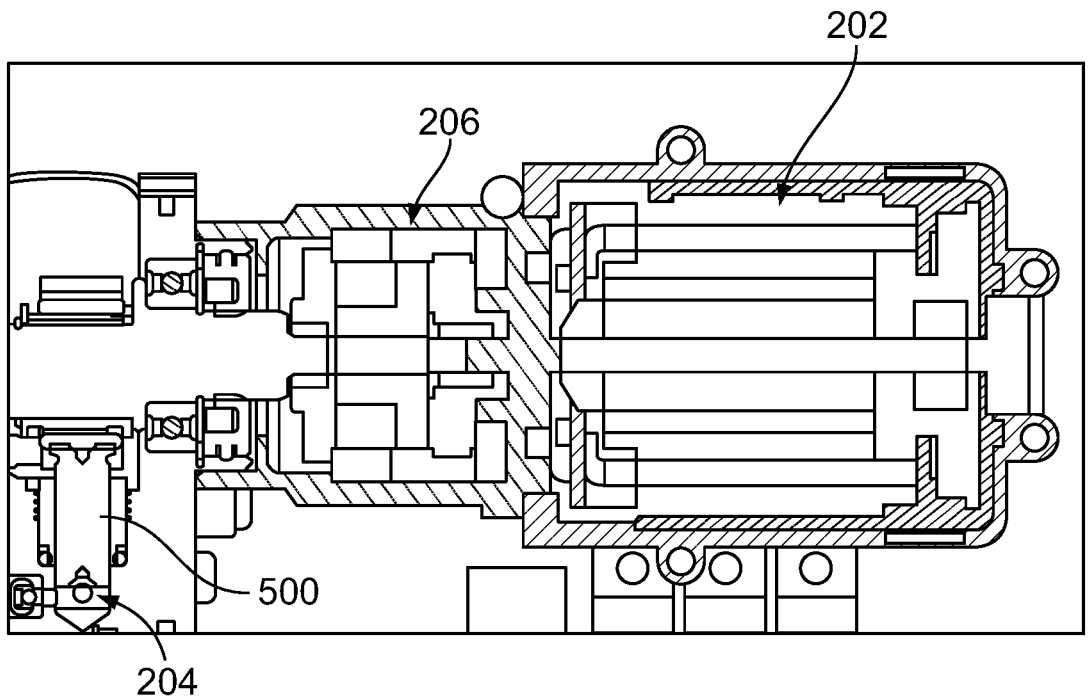
FIG. 5B illustrates another internal, partial cross-sectional side view of the hydraulic tool of FIG. 1, in accordance with an example implementation.
Figure 5C:
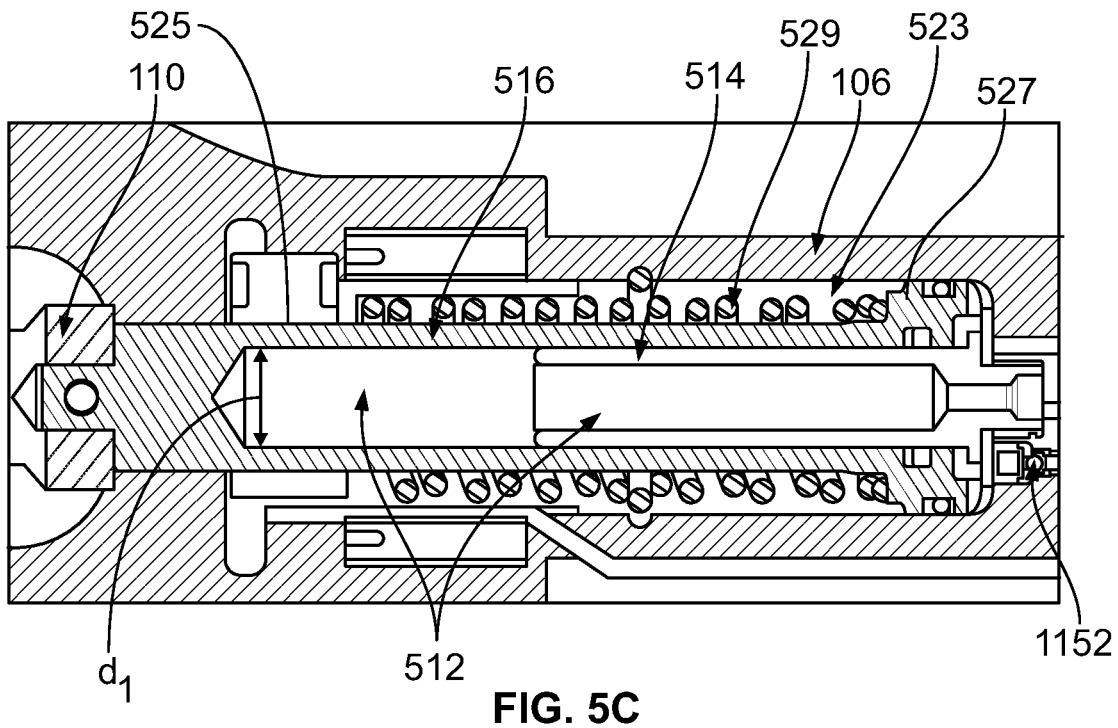
FIG. 5C illustrates another internal, partial cross-sectional side view of the hydraulic tool of FIG. 1, in accordance with an example implementation.

Turning to operation of hydraulic tool 100, and particularly the hydraulic circuit 210 referenced in FIG. 2, FIG. 5A illustrates an internal, partial cross-sectional side view of the hydraulic tool 100, FIG. 5B illustrates another internal, partial cross-sectional side view of the hydraulic tool 100, and FIG. 5C illustrates another internal, partial cross-sectional side view of the hydraulic tool 100, in accordance with an example implementation.

As mentioned above, the electric motor 202 (shown in FIG. 5B) is configured to drive the pump 204 via the gear reducer 206. The electric motor 202 can be configured, for example, as a brushless direct current motor. When an operator presses the extension trigger button 118, an electric signal is provided via the wires 404 to the controller 212 of the hydraulic tool 100. In response, the controller 212 sends a command signal to the electric motor 202, causing an output shaft of the electric motor 202 coupled to the gear reducer 206 to rotate in a first rotational direction.

The hydraulic tool 100 also includes the fluid reservoir 208, which operates as reservoir for storing hydraulic fluid at a low pressure level, e.g., atmospheric pressure or slightly higher than atmospheric pressure such as 30-70 pounds per square inch (psi). As the output shaft of the electric motor 202 rotates in the first rotational direction, the gear reducer 206 causes a pump piston 500 of the pump 204 to reciprocate up and down. As the pump piston 500 moves upward, fluid is withdrawn from the fluid reservoir 208. As the pump piston 500 moves down, the withdrawn fluid is pushed or pumped to a pressure rail 502.

The hydraulic tool 100 further includes a flow control valve 503 configured to control fluid flow between a fluid passage 505 and the fluid reservoir 208. The flow control valve 503 is configured such that, as the electric motor 202 rotates in the first rotational direction, the flow control valve 503 remains closed such that the fluid passage 505 is disconnected from the fluid reservoir 208. On the other hand, if the electric motor 202 rotates in the second rotational direction (opposite the first rotation direction), the flow control valve 503 opens, allowing fluid to flow from the fluid passage 505 to the fluid reservoir 208. In an example, the flow control valve 503 can be configured as a Shear-Seal® valve.

As the electric motor 202 rotates in the first rotational direction and the pump 204 provided fluid to the pressure rail 502, the fluid in the pressure rail 502 is communicated through a check valve 504 and a nose 506 of a sequence valve 508, through a passage 510 to a chamber 512. As shown in FIG. 5C, the chamber 512 is formed partially within an inner cylinder 514 and partially within a piston 516 slidably accommodated within the cylinder 106. The piston 516 is configured to slide about an external surface of the inner cylinder 514 and an inner surface of the cylinder 106. The inner cylinder 514 is threaded into the cylinder 106 and is thus stationary or affixed to the cylinder 106.

As shown in FIG. 5C, the fluid provided to the chamber 512 from the passage 510 applies a pressure on the inner diameter "$d_1$" of the piston 516, thus causing the piston 516 to extend (e.g., move to the left in FIG. 5C). The ram 110 is coupled to the piston 516 such that extension of the piston 516 (i.e., motion of the piston 516 to the left in FIGS. 5A, 5C) within the cylinder 106 causes the ram 110 to move toward the crimping anvil 114 illustrated in FIG. 1.

Figure 5D:
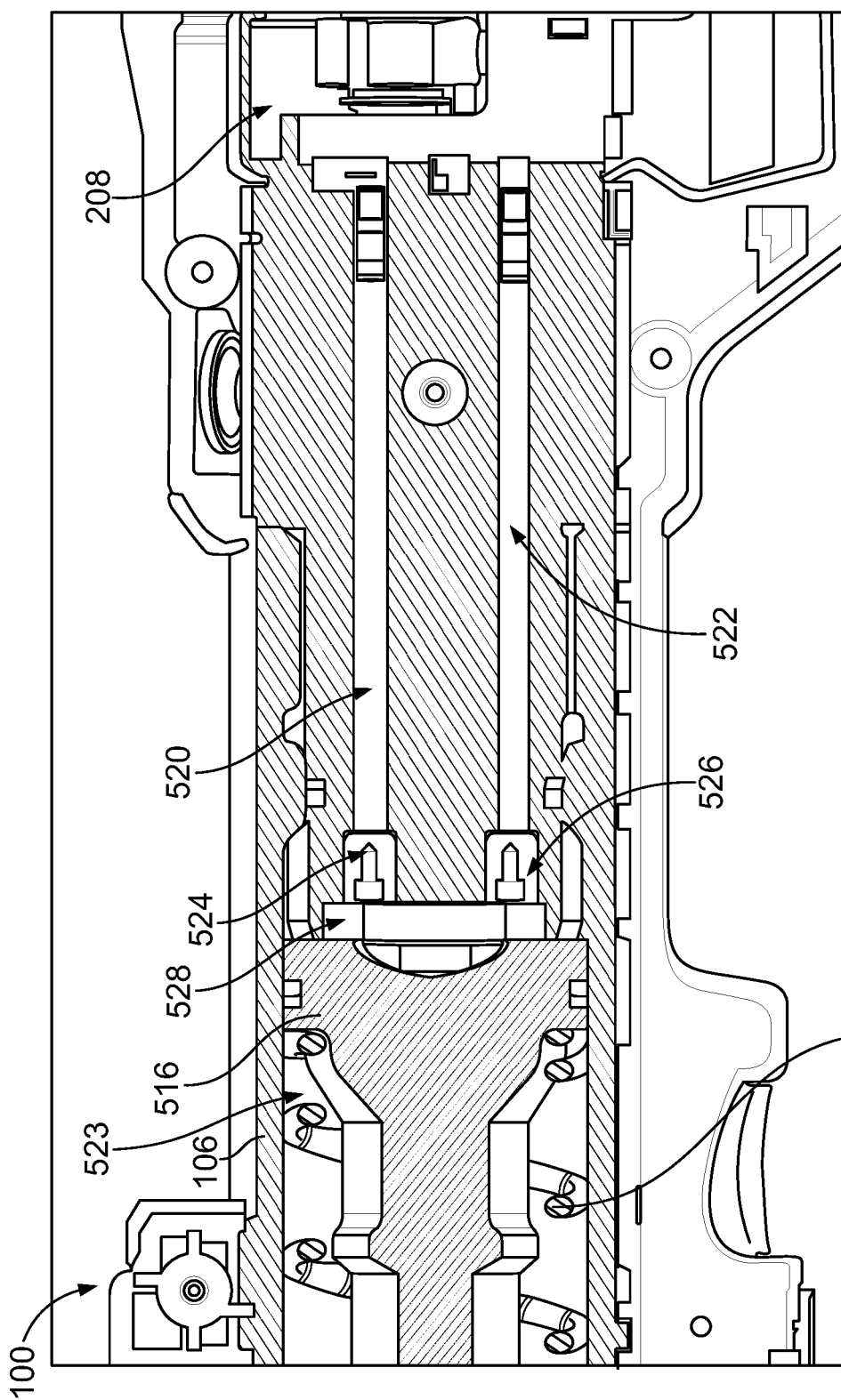
FIG. 5D illustrates another internal cross-sectional side view of the hydraulic tool, in accordance with an example implementation.

FIG. 5D illustrates another internal cross-sectional side view of the hydraulic tool 100, in accordance with an example implementation. As shown in FIG. 5D, the hydraulic tool 100 includes a first longitudinal channel 520 and a second longitudinal channel 522. The hydraulic tool 100 further includes a first bypass check valve 524 disposed in the first longitudinal channel 520 and includes a second bypass check valve 526 disposed in the second longitudinal channel 522. The longitudinal channels 520, 522 and the bypass check valves 524, 526 fluidly couple the fluid reservoir 208 to a chamber 528 formed within the cylinder 106.

As the piston 516 extends within the cylinder 106, pressure level in the chamber 528 can be reduced below the pressure level of the fluid in the fluid reservoir 208, and therefore hydraulic fluid is pulled or drawn from the fluid reservoir 208 through the longitudinal channels 520, 522 and the bypass check valves 524, 526 into the chamber 528.

As the piston 516 extends, the volume of the chamber 528 increases as shown in FIG. 5A and the chamber 528 is filled with hydraulic fluid from the fluid reservoir 208 via the longitudinal channels 520, 522 and the bypass check valves 524, 526. Advantageously, with this configuration, the chamber 528 is being filled with low pressure fluid until high pressure fluid starts to flow therein, and as such, no time is wasted later in filling the chamber 528 when driving the piston 516 with high pressure fluid provided to the chamber 528.

Referring to FIG. 5C, the piston 516 includes a piston rod 525 and a piston head 527. The piston head 527 divides an inside of the cylinder 106 into the chamber 528 and a chamber 523. The chamber 523 is formed between a surface of the piston head 527 that faces toward the ram 110, a surface of the piston rod 525, and an inner surface of the cylinder 106. Respective volumes of the chambers 523 and 528 vary as the piston 516 moves within the cylinder 106.

As shown in FIG. 5C, the hydraulic tool 100 includes a return spring 529 disposed about an exterior peripheral surface of the piston rod 525 of the piston 516. One end of the return spring 529 is fixed and the other end rests against the piston head 527. As the piston 516 extends (e.g., moves to the left in FIG. 5C), the return spring 529 is compressed and thus the force it applies on the piston 516 in an opposing direction to the direction of motion of the piston 516 increases. As such, resistance to motion of the piston 516 increases and pressure level of fluid provided by the pump 204 through pressure rail 502 to the chamber 512 increases.

Referring back to FIG. 5A, the sequence valve 508 includes a poppet 530 that is biased toward a seat 532 via a spring 534. When a pressure level of the fluid in the pressure rail 502 exceeds a threshold value set by a spring rate of the spring 534, the fluid pushes the poppet 530 against the spring 534, thus opening a fluid path through passage 536 to the chamber 528.

As a result, pressurized fluid now acts on the inner diameter "$d_1$" of the piston 516 as well as the annular area of the piston 516 around the inner cylinder 514. As such, pressurized fluid now applies a pressure on an entire diameter "$d_2$" of the piston head 527. While the fluid initially acts on the smaller diameter "$d_1$" only before the pressure level of fluid in the pressure rail 502 exceeds the threshold value, the piston 516 advances at a high speed but can apply a small force. However, by now acting on the entire diameter "$d_2$", the piston 516 can move at a slower speed for a given amount of fluid flow rate but can apply a larger force on an object being crimped. Further, when the sequence valve 508 opens to provide pressurized fluid to the chamber 528, the bypass check valves 524, 526 are blocked or closed and low pressure fluid is no longer drawn from the fluid reservoir 208 via the longitudinal channels 520, 522 into the chamber 528.

As illustrated in FIG. 5A, the hydraulic tool 100 further includes a pilot/shuttle valve 538. The pressurized fluid in the pressure rail 502 is communicated through a nose 540 of the pilot/shuttle valve 538 and acts on a poppet 542 to cause the poppet 542 to be seated at a seat 544 within the pilot/shuttle valve 538. As long as the poppet 542 is seated at the seat 544, fluid flowing through the check valve 504 is precluded from flowing through the nose 540 of the sequence valve 508 and passage 546 around the poppet 542 to a tank passage 548, which is fluidly coupled to the fluid reservoir 208. This way, fluid is forced to enter the chamber 512 via the passage 510 as described above.

Further, fluid in the pressure rail 502 is allowed to flow around the pilot/shuttle valve 538 through annular area 549 to the fluid passage 505. However, as mentioned above, when the flow control valve 503 is closed, the fluid passage 505 is blocked, and fluid communicated to the fluid passage 505 is precluded from flowing to the fluid reservoir 208.

As such, the piston 516 and the ram 110 move toward the crimping anvil 114. The ram 110 can then contact a cable disposed in the work area 112. The cable provides further resistance to movement of the ram 110 and the piston 516, and as such pressure level of the fluid entering the chamber 528 increases. As a result, the force applied to the piston 516 by the pressurized fluid increases, and therefore the force applied by the ram 110 to the cable increases until the cable is crimped.

Thereafter, the operator may want to retract the piston 516 (e.g., move the piston 516 to the right in FIG. 5A) to release the cable and render the hydraulic tool 100 ready for a subsequent crimping operation. To retract the piston 516, the operator can press the retraction trigger button 120. When an operator presses the retraction trigger button 120, an electric signal is provided via the wires 404 to the controller 212 of the hydraulic tool 100. In response, the controller 212 sends a command signal to the electric motor 202, causing an output shaft of the electric motor 202 coupled to the gear reducer 206 to rotate in a second rotational direction opposite the first rotational direction.

Referring to FIG. 5A, rotating the electric motor 202 in the second rotational direction causes the flow control valve 503 to open, thus causing a fluid path to form between the pressure rail 502 through the annular area 549 and the fluid passage 505 to the fluid reservoir 208. As a result of fluid in the pressure rail 502 being allowed to flow to the fluid reservoir 208 when the flow control valve 503 is opened, the pressure level in the pressure rail 502 decreases (e.g., to the pressure level of fluid in the fluid reservoir 208 or slightly higher).

Figure 5E:
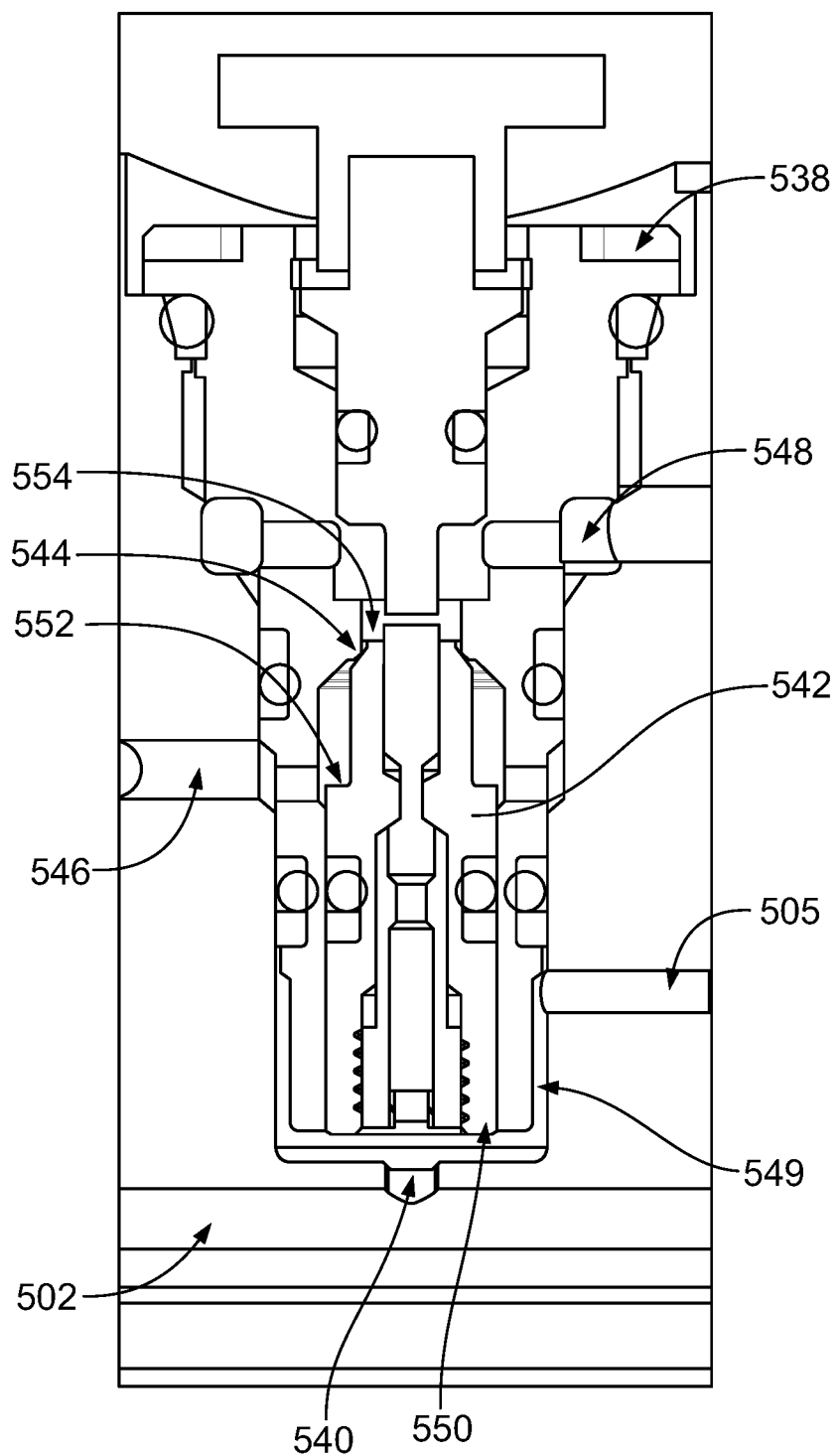
FIG. 5E illustrates a cross-sectional view of a pilot/shuttle valve, in accordance with an example implementation.

FIG. 5E illustrates a cross-sectional view of the pilot/shuttle valve 538, in accordance with an example implementation. Once the pressure rail 502 is depressurized as a result of the flow control valve 503 being opened, pressure level acting at a first end 550 of the poppet 542 is decreased. At the same time, pressurized fluid in the chamber 512 is communicated to the passage 546 through the nose 506 of the sequence valve 508 and acts on a surface area of a flange 552 of the poppet 542. As a result, the poppet 542 is unseated (e.g., by being pushed downward in FIG. 5E).

The return spring 529 described above and shown in FIGS. 5A, 5C pushes the piston 516 (e.g., to the right in FIGS. 5A, 5C). As a result, fluid in the chamber 512 is forced out of the chamber 512 through the nose 506 of the sequence valve 508 to the passage 546, then around a nose or second end 554 of the poppet 542 (now-unseated) to the tank passage 548, and then to the fluid reservoir 208. Similarly, fluid in the chamber 528 is forced out of the chamber 528 through a check valve 556 (shown in FIG. 5A), through the nose 506 of the sequence valve 508 to the passage 546, then around the nose or second end 554 of the poppet 542 to the tank passage 548, and then to the fluid reservoir 208. The check valve 504 (described with respect to FIG. 5A) blocks fluid from flow back to the pressure rail 502. Flow of fluid from the chambers 512 and 528 to the fluid reservoir 208 allows the piston 516 to retract and return to a start position, and the hydraulic tool 100 is again ready for another cycle or crimping operation.

The controller 212 can be configured to handle conditions where the trigger buttons 118, 120 are pressed simultaneously, or pressed within a threshold amount of time (e.g., 0.5 seconds) of each other. For example, if the trigger buttons 118, 120 are pressed simultaneously, the hydraulic tool 100 can be configured to not provide any signal to the controller 212. Alternatively, if the trigger buttons 118, 120 are pressed simultaneously and the controller 212 receives both electric signals, the controller 212 can be configured to provide no signals to the electric motor 202. As such, the hydraulic tool 100 remains unactuated.

In another example, if the operator presses the extension trigger button 118 and then within a threshold amount of time (e.g., 0.5-1 seconds) presses the retraction trigger button 120, the controller 212 can be configured to continue extension of the piston 516 (i.e., continue sending the command to the electric motor 202 causing it to rotate in the first rotational direction) as if the retraction trigger button 120 has not been pressed. Similarly, in another example, if the operator presses the retraction trigger button 120 and then within a threshold amount of time (e.g., 0.5-1 seconds) presses the extension trigger button 118, the controller 212 can be configured to continue retraction of the piston 516 (i.e., continue sending the command to the electric motor 202 causing it to rotate in the second rotational direction) as if the extension trigger button 118 has not been pressed.

Referring back to FIG. 1, to crimp an object, e.g., a cable, the object can be positioned within the work area 112, and the ram 110 is then advanced as the piston 516 extends as described above. The ram 110 and the crimping anvil 114 can then apply a compression force to the object(s) (e.g., metals, wires, cables, and/or other electrical connectors) positioned between the ram 110 and the crimping anvil 114 in the work area 112. After a crimping operation is completed, the ram 110 can be retracted as described above to release the object or cable and allow it to be retrieved from the work area 112.

Positioning an object or a cable in, or retrieving the cable from, the work area 112 can take place by inserting the cable laterally within the work area 112. However, in some examples, the cable might be long and therefore inserting and removing the cable laterally can be time-consuming. Also, in tight work spaces, it may be difficult to insert and remove the cable laterally.

As such, it may be desirable to allow the crimping anvil 114 to be pivotable, such that the crimping anvil 114 can pivot to open and expose the work area 112, thereby allowing the cable to be inserted longitudinally to within the work area 112. For instance, the hydraulic tool 100 can be configured such that the crimping anvil 114 can be released at a first end 122 and then pivot about a second end 124 coupled to the crimper frame 108. This way, the work area 112 is longitudinally exposed and an object or cable can be inserted therein. Described next are example implementations that allow the crimping anvil 114 to be released at one end and pivot about another end.

Figure 6A:
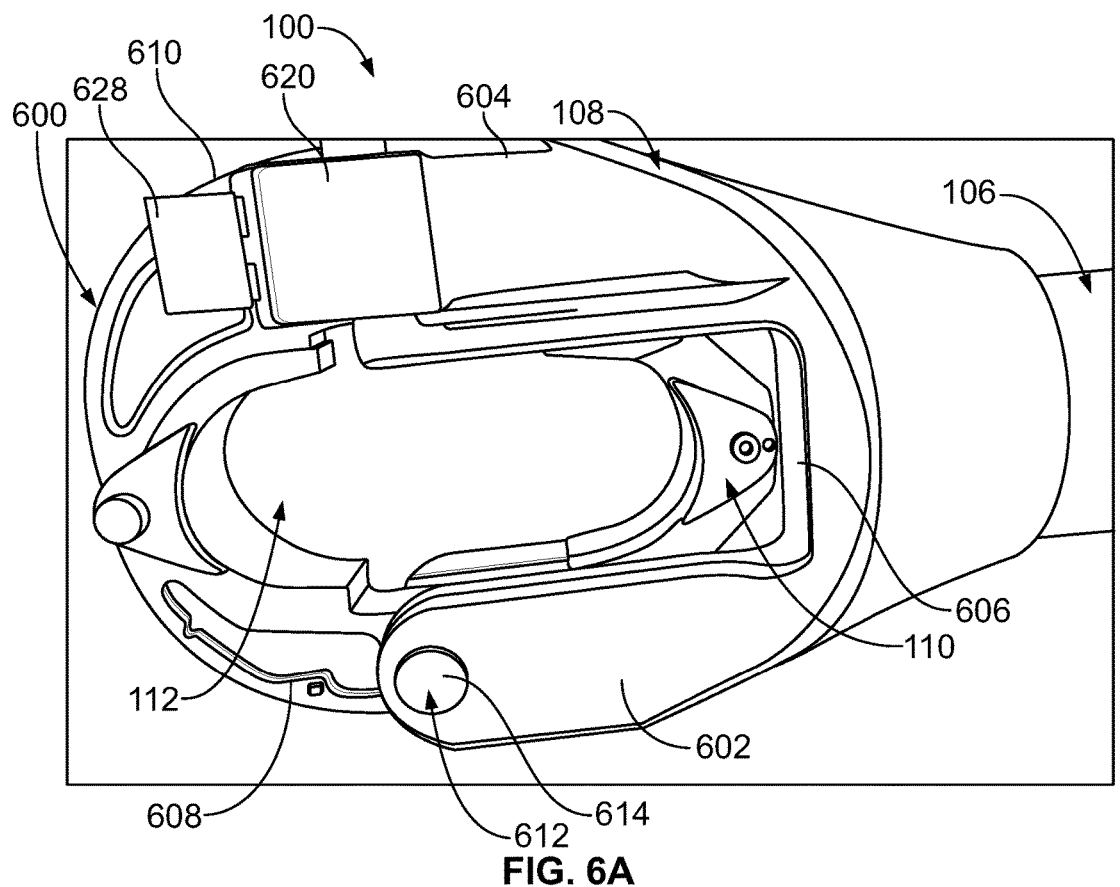
FIG. 6A illustrates a partial side view of a hydraulic tool with a pivotable crimping anvil, in accordance with an example implementation.
Figure 6B:
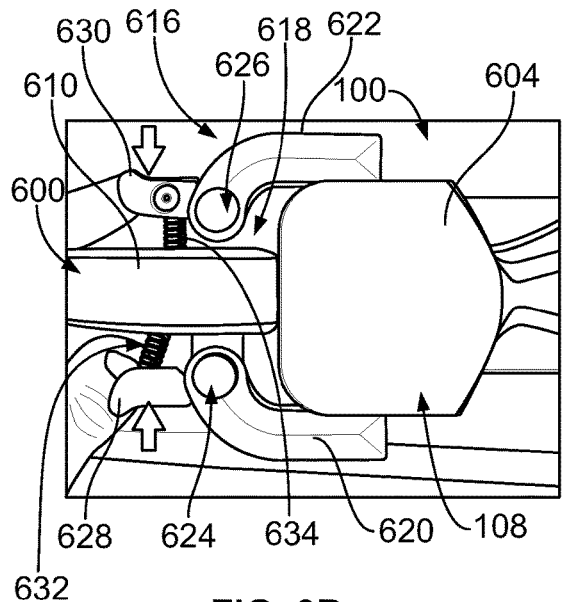
FIG. 6B illustrates a partial top view of the hydraulic tool of FIG. 6A with a pivotable crimping anvil being latched to a crimper frame, in accordance with an example implementation.
Figure 6C:
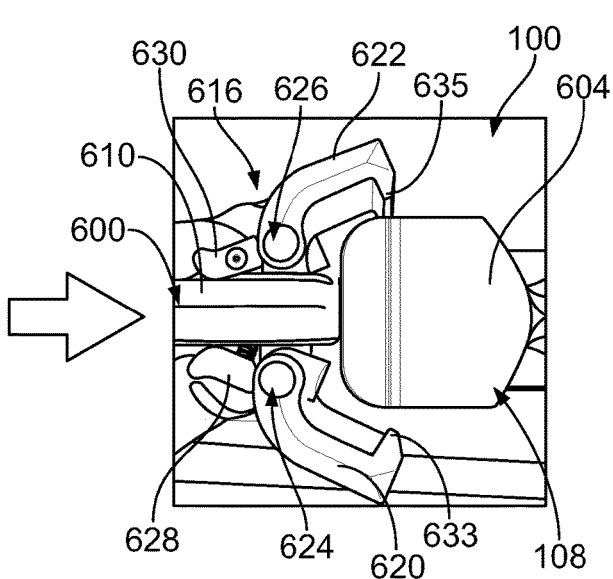
FIG. 6C illustrates a partial top view of the hydraulic tool of FIG. 6A with the pivotable crimping anvil being unlatched from the crimper frame to allow pivoting thereof, in accordance with an example implementation.

FIG. 6A illustrates a partial side view of the hydraulic tool 100 with a pivotable crimping anvil 600, FIG. 6B illustrates a partial top view of the hydraulic tool 100 with the pivotable crimping anvil 600 being latched to the crimper frame 108, and FIG. 6C illustrates a partial top view of the hydraulic tool 100 with the pivotable crimping anvil 600 being unlatched from the crimper frame 108 to allow pivoting thereof, in accordance with an example implementation. The pivotable crimping anvil 600 represents an example implementation of the crimping anvil 114 described above.

As shown in FIG. 6A, the crimper frame 108 can be shaped as a U-shaped yoke having two generally-parallel leg portions 602 and 604 and a base or connecting portion 606 that couples or connects the leg portions 602, 604 to each other. Similarly, the pivotable crimping anvil 600 can be configured as a C- or U-shaped yoke or member having a first arm 608 and a second arm 610.

The first arm 608 is coupled to the first leg portion 602 of the crimper frame 108 at an anvil pivot 612. For example, the first leg portion 602 can have two prongs forming a space therebetween in which the first arm 608 can be inserted partially. The two prongs of the first leg portion 602 can have respective through-holes formed therein and the first arm 608 can have a corresponding through-hole that aligns with the respective through-holes of the first leg portion 602 to form a channel configured to receive a pivot pin 614 therein. On the other hand, the second arm 610 of the pivotable crimping anvil 600 is releasably coupled to the second leg portion 604 of the crimper frame 108 via a latching mechanism 616 illustrated in FIGS. 6B-6C.

Referring to FIG. 6B, the latching mechanism 616 can include a lateral or cross bar 618 coupled to the pivotable crimping anvil 600. The latching mechanism further includes a first gripping latch arm 620 and a second gripping latch arm 622 that are pivotably coupled to the cross bar 618. Particularly, a first end of the first gripping latch arm 620 is pivotably coupled to the cross bar 618 at a pivot 624, and a first end of the second gripping latch arm 622 is pivotably coupled to the cross bar 618 at a pivot 626. A second end of the first gripping latch arm 620 and a second end of the second gripping latch arm 622 are configured to grip on the crimper frame 108 when the pivotable crimping anvil 600 is in the closed or latched state shown in FIG. 6B.

Particularly, the latching mechanism 616 can include a first release lever 628 coupled to the first gripping latch arm 620, e.g., at the pivot 624. The latching mechanism 616 can also include a second release lever 630 coupled to the second gripping latch arm 622, e.g., at the pivot 626.

Further, the latching mechanism 616 includes a first spring 632 that biases the first release lever 628 and the first gripping latch arm 620 toward a gripping position shown in FIG. 6B where the first gripping latch arm 620 contacts and grips on a surface of the second leg portion 604 of the crimper frame 108. For instance, a first end of the first spring 632 can be secured against an exterior surface of the second arm 610 of the pivotable crimping anvil 600, whereas a second end of the first spring 632 is coupled to the first release lever 628. With this configuration, the first spring 632 biases the first release lever 628 and the first gripping latch arm 620 pivotably coupled thereto in a counter-clockwise direction in FIG. 6B to grip on the crimper frame 108.

As an example for illustration, the first gripping latch arm 620 and the crimper frame 108 can having corresponding retention structures that facilitate forming a grip between the first gripping latch arm 620 and the surface of the crimper frame 108. For instance, the first gripping latch arm 620 can have a protrusion or projection 633 (shown in FIG. 6C) that is configured to mate and engage with a ridge formed in the surface of the crimper frame 108. As such, when the first gripping latch arm 620 is biased toward the crimper frame 108 via the first spring 632, it grips on the crimper frame 108.

Similarly, the latching mechanism 616 includes a second spring 634 that biases the second release lever 630 and the second gripping latch arm 622 toward a gripping position shown in FIG. 6B where the second gripping latch arm 622 contacts and grips on the surface of the second leg portion 604 of the crimper frame 108. For instance, a first end of the second spring 634 can be secured against the exterior surface of the second arm 610 of the pivotable crimping anvil 600, whereas a second end of the second spring 634 is coupled to the second release lever 630. With this configuration, the second spring 634 biases the second release lever 630 and the second gripping latch arm 622 pivotably coupled thereto in a clockwise direction in FIG. 6B to grip on the crimper frame 108.

As an example for illustration, similar to the first gripping latch arm 620, the second gripping latch arm 622 and the crimper frame 108 can having corresponding retention structures that facilitate forming a grip between the second gripping latch arm 622 and the surface of the crimper frame 108. For instance, the second gripping latch arm 622 can have a protrusion or projection 635 (shown in FIG. 6C) that is configured to mate and engage with a ridge formed in the surface of the crimper frame 108. As such, when the second gripping latch arm 622 is biased toward the crimper frame 108 via the second spring 634, it grips on the crimper frame 108.

In the closed or latched state shown in FIG. 6B, the hydraulic tool 100 is ready for a crimping operation. Once the crimping operation is completed and it is desired to remove the crimped object from the work area 112, the latching mechanism 616 can be actuated to release the pivotable crimping anvil 600 and allow it to be pivoted about the anvil pivot 612 to enable removing the crimped object longitudinally and positioning another object within the work area 112.

Particularly, the operator can squeeze the first release lever 628 (e.g., upward in FIG. 6B) and the second release lever 630 (e.g., downward in FIG. 6B), thereby compressing the springs 632, 634 respectively. As a result, the first spring 632 pulls the first gripping latch arm 620, which then pivots clockwise to a released position about the pivot 624, and similarly, the second spring 634 pulls the second gripping latch arm 622, which then pivots counter-clockwise to a released position about the pivot 626.

FIG. 6C illustrates the gripping latch arms 620, 622 in released positions. In the released positions, the gripping latch arms 620, 622 and their projections 633, 635 disengage from the second leg portion 604 of the crimper frame 108 as depicted in FIG. 6C. With the gripping latch arms 620, 622 being released from the crimper frame 108, the operator can now rotate or pivot the pivotable crimping anvil 600 in a counter-clockwise direction in FIG. 6A to pivot the pivotable crimping anvil 600 about the anvil pivot 612, thereby allowing the work area 112 to be longitudinally-accessible such that the crimped object can be removed and another object can be placed therein.

Figure 7A:
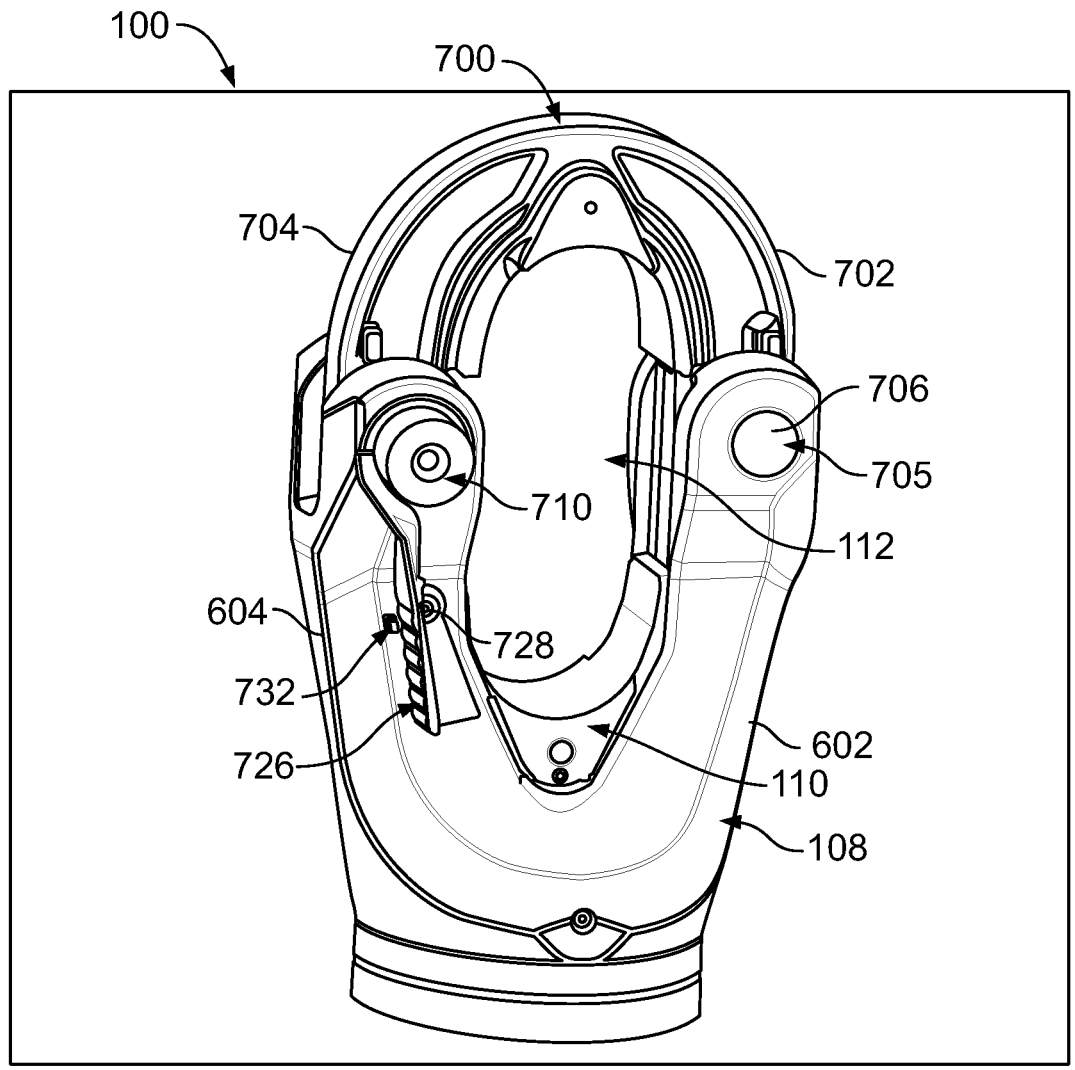
FIG. 7A illustrates a partial perspective view of a hydraulic tool with an alternative latch mechanism, in accordance with an example implementation.
Figure 7B:
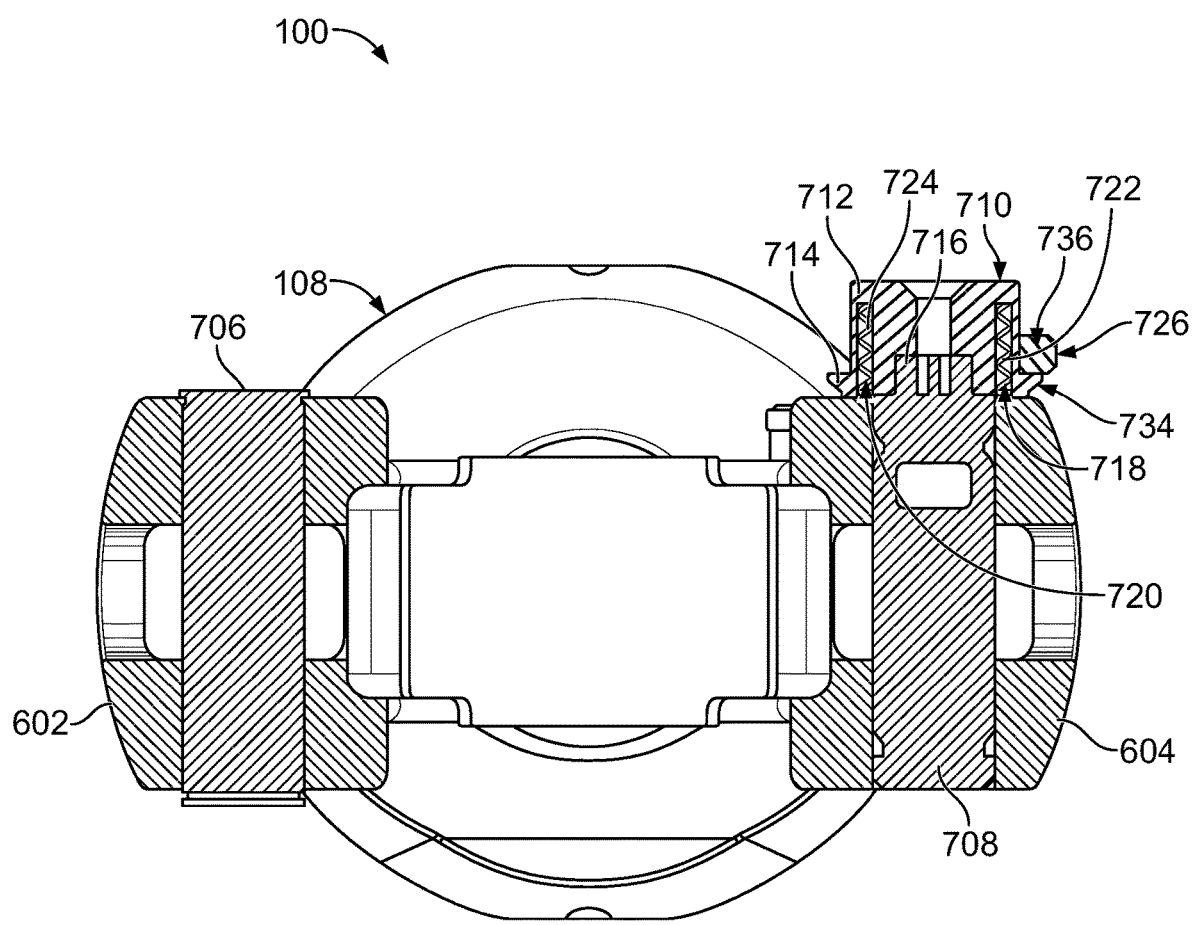
FIG. 7B illustrates a cross-sectional front view of the hydraulic tool of FIG. 7A showing components of the alternative latch mechanism, in accordance with an example implementation.
Figure 7C:
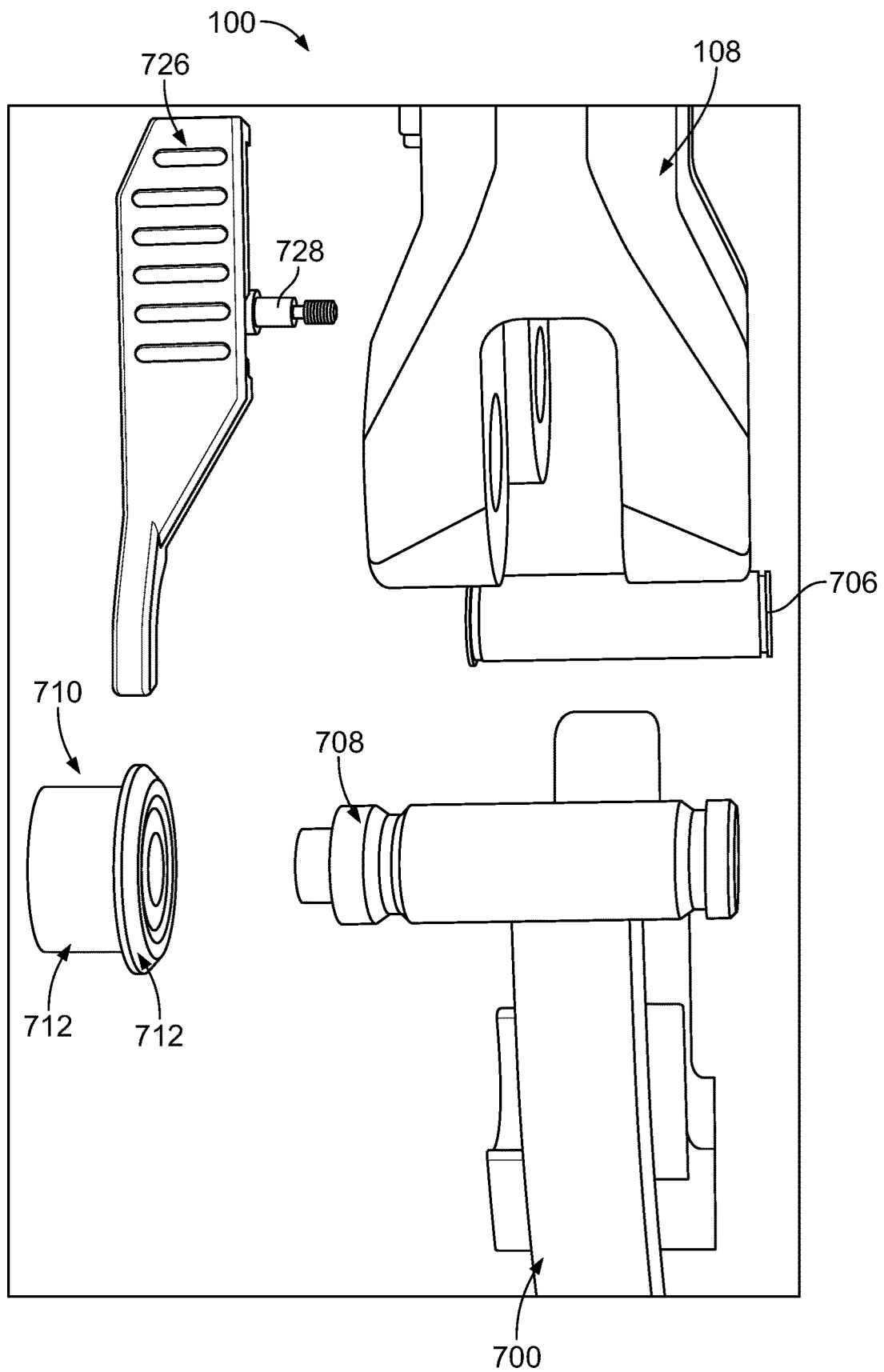
FIG. 7C illustrates a partial exploded view of the hydraulic tool of FIG. 7A showing components of the alternative latch mechanism, in accordance with an example implementation.

FIGS. 7A, 7B, and 7C illustrate a different example implementation. Particularly, FIG. 7A illustrates a partial perspective view of the hydraulic tool 100 with an alternative latch mechanism, FIG. 7B illustrates cross-sectional front view of the hydraulic tool 100 showing components of the alternative latch mechanism, and FIG. 7C illustrates a partial exploded view of the hydraulic tool showing components of the alternative latch mechanism, in accordance with an example implementation. FIGS. 7A, 7B, and 7C are described together.

FIGS. 7A and 7C depict a pivotable crimping anvil 700 that represents an example implementation of the crimping anvil 114 described above. Similar the pivotable crimping anvil 600, the pivotable crimping anvil 700 can be configured as a C- or U-shaped yoke or member having a first arm 702 and a second arm 704. The first arm 702 is coupled to the first leg portion 602 of the crimper frame 108 at an anvil pivot 705. For example, the first leg portion 602 can have two prongs forming a space therebetween in which the first arm 702 can be inserted partially. The two prongs of the first leg portion 602 can have respective through-holes formed therein and the first arm 702 can have a corresponding through-hole that aligns with the respective through-holes of the first leg portion 602 to form a channel configured to receive a pivot pin 706 therein.

The second leg portion 604 of the crimper frame 108 can also have two respective prongs forming a space therebetween in which the second arm 704 of the pivotable crimping anvil 700 can be inserted partially. The two respective prongs of the second leg portion 604 can have respective through-holes formed therein and the second arm 704 can have a corresponding through-hole that aligns with the respective through-holes of the second leg portion 604 to form a channel configured to receive a releasable pin 708 (see FIGS. 7B, 7C) therein.

As shown in FIG. 7B, the releasable pin 708 is coupled to a cap 710. The cap 710 can have a cylindrical portion 712 and a flanged portion 714. The cap 710 has a cavity therein to receive and retain a head portion 716 of the releasable pin 708 therein. Further, the cap 710 has a first slot or longitudinal blind hole 718 and a second slot or longitudinal blind hole 720. The first longitudinal blind hole 718 houses a first spring 722, whereas the second longitudinal blind hole 720 houses a second spring 724.

The first spring 722 has a first end that rests against the second leg portion 604 and a second end that rests against an interior surface bounding the first longitudinal blind hole 718 of the cap 710. Thus, the first spring 722 applies a biasing force on the cap 710 and the releasable pin 708 outward (e.g., upward in FIG. 7B). Similarly, the second spring 724 has a first end that rests against the second leg portion 604 and a second end that rests against an interior surface bounding the second longitudinal blind hole 720 of the cap 710. Thus, the second spring 724 applies a biasing force on the cap 710 and the releasable pin 708 outward (e.g., upward in FIG. 7B).

As such, the springs 722, 724 cooperate to bias the cap 710 and the releasable pin 708 outward with a biasing force that tend to release the releasable pin 708 from the second leg portion 604. However, in the position shown in FIGS. 7A, 7B, the cap 710 and the releasable pin 708 are retained in an inserted position in the second leg portion 604 by way of a release lever 726.

Referring to FIGS. 7A and 7C, the release lever 726 is pivotably coupled to the second leg portion 604 of the crimper frame 108 via a screw 728. Further, a torsional spring (not shown) can be disposed at an interface between the release lever 726 and the second leg portion 604 of the crimper frame 108, such that the torsional spring biases the release lever 726 toward the position shown in FIG. 7A (e.g., biases the release lever 726 in a clockwise direction in FIG. 7A).

In this biased position, the release lever 726 can retain the cap 710 and the releasable pin 708 in the position shown in FIG. 7A, where the pivotable crimping anvil 700 is in a closed state. Particularly, the release lever 726 can have a distal portion 730 having a circular interior profile that matches curvature of the cap 710 to allow the release lever 726 to interface with and retain the cap 710. As shown in FIG. 7B, in this position, the release lever 726 is positioned in contact with the flanged portion 714 of the cap 710, and therefore, the cap 710 and the releasable pin 708 cannot "pop" or be pushed outward (e.g., upward in FIG. 7B) by the springs 722, 724. Rather, the releasable pin 708 and the cap 710 remain engaged with the second leg portion 604 and the second arm 704 of the pivotable crimping anvil 700. In this position, an object placed within the work area 112 can be crimped as described above.

To release the object after completing a crimping operation, the release lever 726 can be pivoted or rotated (in a counter-clockwise direction in FIG. 7A) by the operator about the screw 728, therefore allowing the springs 722, 724 to push the cap 710 and the releasable pin 708 coupled thereto outwardly from the longitudinal holes of the second arm 704 and the second leg portion 604. As a result, the pivotable crimping anvil 700 is now released from engagement with the crimper frame 108 via the releasable pin 708. With the second arm 704 being released from engagement with the second leg portion 604, the operator can now rotate or pivot the pivotable crimping anvil 700 in a clockwise direction in FIG. 7A to pivot the pivotable crimping anvil 700 about the anvil pivot 705, thereby allowing the work area 112 to be longitudinally-accessible such that the crimped object can be removed and another object can be placed therein.

If the release lever 726 is released by the operator, the above-mentioned torsional spring can cause the release lever 726 to rotate or return back to its biased, un-pivoted position. To preclude the release lever 726 from impacting the spring 722 that is now, at least partially, exposed as the cap 710 and releasable pin 708 are pushed outward, the crimper frame 108 can have a protrusion 732 configured as a stop feature that stops the release lever 726 at a particular position prior to reaching the spring 722. This way, damage or deterioration of the spring 722 can be prevented.

To perform a subsequent crimping operation, an object can be positioned in the work area 112, and the pivotable crimping anvil 700 can then be rotated back (counter-clockwise in FIG. 7A) to place the second arm 704 partially within the second leg portion 604 of the crimping frame and align their through-holes in preparation for receiving the releasable pin 708 therein. The operator can then push the cap 710 and the releasable pin 708 back inwardly against the biasing force of the springs 722, 724.

Notably, referring to FIG. 7B, the flanged portion 714 can have a chamfered exterior peripheral surface 734 and the release lever 726 can have a corresponding chamfered interior surface 736. As such, as the cap 710 is being pushed inwardly to re-engage the releasable pin 708 with the pivotable crimping anvil 700, the chamfered exterior peripheral surface 734 contacts the chamfered interior surface 736, thereby slightly pushing the release lever 726 (e.g., to the right in FIG. 7B and counter-clockwise in FIG. 7A) out of the way until the flanged portion 714 "pops over" the release lever 726 and contacts the second leg portion 604. The release lever 726 is then returned back by the above-mentioned torsional spring to the position shown in FIG. 7B where it locks or retains the cap 710 (and the releasable pin 708) in place. The hydraulic tool 100 is now ready for a subsequent crimping operation.

Figure 8:
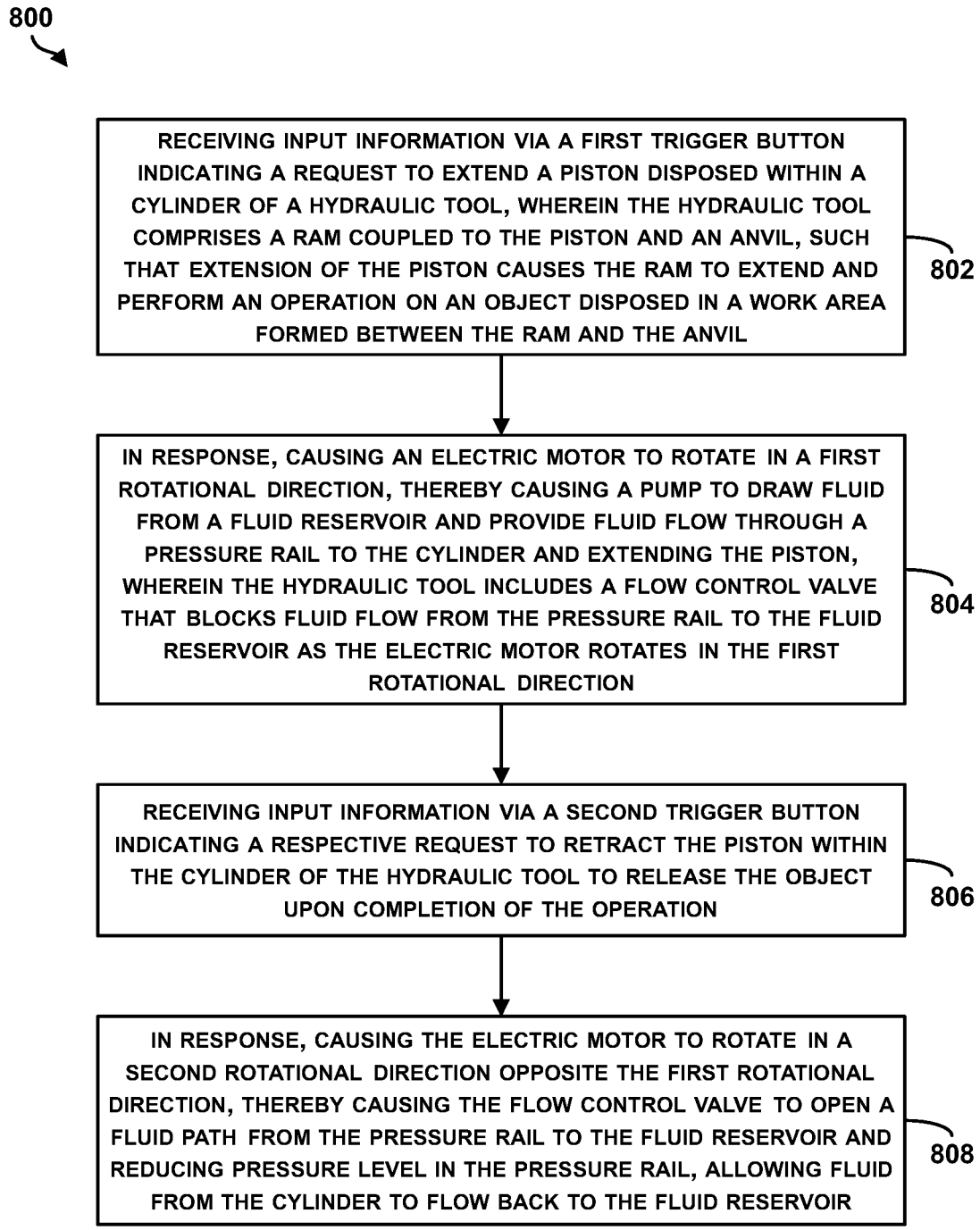
FIG. 8 is a flowchart of a method for operating a hydraulic tool, in accordance with an example implementation.

FIG. 8 is a flowchart of a method 800 for operating a hydraulic tool, in accordance with an example implementation. The method 800 can, for example, be performed by a controller such as the controller 212 to control the hydraulic tool 100.

The method 800 may include one or more operations, or actions as illustrated by one or more of blocks 802-808. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 800 and other processes and operations disclosed herein, the flowchart shows operation of one possible implementation of present examples. In this regard, each block may represent a module, a segment, or a portion of program code, which includes one or more instructions executable by a processor or a controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the method 800 and other processes and operations disclosed herein, one or more blocks in FIG. 8 may represent circuitry or digital logic that is arranged to perform the specific logical operations in the process.

At block 802, the method 800 includes receiving input information via a first trigger button (e.g., the extension trigger button 118) indicating a request to extend the piston 516 disposed within the cylinder 106 of the hydraulic tool 100, wherein the hydraulic tool 100 comprises the ram 110 coupled to the piston 516 and an anvil (e.g., the crimping anvil 114), such that extension of the piston 516 causes the ram 110 to extend and perform an operation on an object disposed in the work area 112 formed between the ram 110 and the anvil (e.g., the crimping anvil 114).

At block 804, the method 800 includes, in response, causing the electric motor 202 to rotate in a first rotational direction, thereby causing the pump 204 to draw fluid from the fluid reservoir 208 and provide fluid flow through the pressure rail 502 to the cylinder 106 and extending the piston 516, wherein the hydraulic tool 100 includes the flow control valve 503 that blocks fluid flow from the pressure rail 502 to the fluid reservoir 208 as the electric motor 202 rotates in the first rotational direction.

At block 806, the method 800 includes receiving input information via a second trigger button (e.g., the retraction trigger button 120) indicating a respective request to retract the piston 516 within the cylinder 106 of the hydraulic tool 100 to release the object upon completion of the operation.

At block 808, the method 800 includes, in response, causing the electric motor 202 to rotate in a second rotational direction opposite the first rotational direction, thereby causing the flow control valve 503 to open a fluid path from the pressure rail 502 to the fluid reservoir 208 and reducing pressure level in the pressure rail 502, allowing fluid from the cylinder 106 to flow back to the fluid reservoir 208.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A hydraulic tool comprising:
    a fluid reservoir;
    a pump fluidly coupled to the fluid reservoir;
    an electric motor mechanically coupled to the pump;
    a cylinder;
    a pressure rail fluidly coupled to the pump;
    a sequence valve fluidly coupled to the pressure rail and the cylinder;
    a shuttle valve in fluid communication with the sequence valve, the pressure rail, and the fluid reservoir;
    an inner cylinder affixed to the cylinder;
    a piston defining a piston rod and a piston head, each of the piston rod and the piston head positioned to slide on an external surface of the inner cylinder, the piston slidably accommodated within the cylinder;
    a first trigger button;
    a second trigger button; and
    a controller configured to perform operations comprising:
        receiving a first signal when the first trigger button is triggered,
        in response to the first signal, causing the electric motor to rotate in a first rotational direction, causing the pump to provide fluid to the cylinder through the sequence valve, causing the shuttle valve to be moved to a first position to prevent flow from the sequence valve to the fluid reservoir, and causing the piston to move in a first linear direction,
        receiving a second signal when the second trigger button is triggered, and in response to the second signal, causing the electric motor to rotate in a second rotational direction opposite the first rotational direction, opening a fluid path from the cylinder to the fluid reservoir to depressurize the pressure rail, and causing the piston to move in a second linear direction opposite the first linear direction,
        the shuttle valve in a second position when the pressure rail is depressurized to allow flow from the sequence valve to the fluid reservoir.

2. The hydraulic tool of claim 1, further comprising:
    a flow control valve configured to control fluid flow between the pressure rail and the fluid reservoir.

3. The hydraulic tool of claim 2, wherein the flow control valve is configured to be: (i) closed when the electric motor rotates in the first rotational direction to block fluid flow from the pressure rail to the fluid reservoir, thereby allowing fluid to flow to the cylinder and the piston to move in the first linear direction, and (ii) open when the electric motor rotates in the second rotational direction to form a fluid path for fluid flow from the pressure rail to the fluid reservoir, allowing the piston to move in the second linear direction.

4. The hydraulic tool of claim 1, further comprising:
    a housing configured to contain the electric motor and the pump, wherein the cylinder is coupled to the housing; and
    a handle coupled to the housing, wherein a portion of an exterior profile of the handle comprises a first depression and a second depression spatially arranged in series along the portion of the exterior profile, and wherein the first trigger button is disposed in the first depression and the second trigger button is disposed in the second depression.

5. The hydraulic tool of claim 4, wherein the handle is configured as a two-piece collar comprising:
    a first collar piece; and
    a second collar piece configured to be coupled to the first collar piece, wherein each of the first collar piece and the second collar piece comprises a respective curved, concave interior peripheral surface that matches curvature of the cylinder, such that the first collar piece and the second collar piece are coupled to each other around an exterior peripheral surface of the cylinder.

6. The hydraulic tool of claim 1, further comprising:
    an elastomeric wrap disposed about an exterior peripheral surface of the cylinder, wherein the elastomeric wrap is configured as a C-shaped wrap having a partial circular cross section and forms a gap through which wires extend to electrically couple, and carry the first signal and the second signal from, the first trigger button and the second trigger button, respectively, to the controller.

7. The hydraulic tool of claim 6, further comprising:
    a wire cover having a curved profile that matches curvature of the cylinder and is configured to cover the wires disposed through the gap.

8. The hydraulic tool of claim 1, further comprising:
    a frame coupled to the cylinder;
    a ram coupled to the piston; and
    an anvil disposed opposite the ram, such that the anvil and the ram form a work area therebetween, and wherein the anvil is pivotably coupled to the frame at an anvil pivot.

9. The hydraulic tool of claim 8, further comprising:
    a latching mechanism comprising:
        a first gripping latch arm pivotably coupled to the anvil at a first pivot and configured to contact and grip the frame when the latching mechanism is in a first state; and
        a second gripping latch arm pivotably coupled to the anvil at a second pivot and configured to contact and grip the frame when the latching mechanism is in the first state, wherein the first gripping latch arm is configured to pivot about the first pivot and the second gripping latch arm is configured to pivot about the second pivot to release the anvil from the frame and allow the anvil to pivot about the anvil pivot.

10. The hydraulic tool of claim 9, wherein the latching mechanism further comprises:
    a first release lever coupled to the first gripping latch arm;
    a first spring configured to bias the first release lever and the first gripping latch arm toward the frame;

a second release lever coupled to the second gripping latch arm; and a second spring configured to bias the second release lever and the second gripping latch arm toward the frame, wherein actuating the first release lever and the second release lever against the first spring and the second spring, respectively, causes the latching mechanism to be in a second state in which the first gripping latch arm and the second gripping latch arm pivot away, and are released, from the frame to allow the anvil to pivot about the anvil pivot.

11. The hydraulic tool of claim 8, further comprising:
a releasable pin;
a cap coupled to the releasable pin; and
a release lever pivotably coupled to the frame and configured to interact with the cap to retain the cap and the releasable pin in a first position in which the releasable pin is disposed through the frame and the anvil to couple the anvil to the frame.

12. The hydraulic tool of claim 11, wherein the cap comprises at least one longitudinal blind hole formed therein, the hydraulic tool further comprising:
a spring disposed in the at least one longitudinal blind hole and configured to bias the cap against the release lever, such that as the release lever pivots, the cap is released and the spring causes the cap and the releasable pin to move to a second position in which the releasable pin moves out of the anvil, thereby releasing the anvil from the frame.

13. The hydraulic tool of claim 12, wherein the frame includes a protrusion that precludes the release lever from interacting with the spring when the release lever returns to an un-pivoted position while the cap and the releasable pin are in the second position.

14. The hydraulic tool of claim 12, wherein the cap includes a cylindrical portion and a flanged portion, wherein the release lever interacts with the flanged portion of the cap to retain the cap and the releasable pin in the first position.

15. The hydraulic tool of claim 14, wherein the flanged portion comprises a chamfered exterior peripheral surface, wherein the release lever comprises a corresponding chamfered interior surface, such that as the cap is being pushed inwardly against the spring to re-engage the anvil, the chamfered exterior peripheral surface of the flanged portion of the cap contacts the corresponding chamfered interior surface of the release lever to facilitate returning the cap and the releasable pin to the first position.

16. The hydraulic tool of claim 1, wherein the controller, in response to receiving the first signal, performs a crimp according to crimp data stored in the controller, and
wherein the crimp data includes one or more of connector type and preferred crimp distance.

* * * * *